United States Patent
Yang et al.

(10) Patent No.: US 9,356,665 B2
(45) Date of Patent: *May 31, 2016

(54) METHOD AND APPARATUS FOR DATA TRANSMISSION BASED ON MULTIPLE CELL COLLABORATION

(71) Applicants: LG Electronics Inc., Seoul (KR); INDUSTRY-ACADEMIC COOPERATION FOUNDATION, YONSEI UNIVERSITY, Seoul (KR)

(72) Inventors: Suck Chel Yang, Anyang-si (KR); Dong Ku Kim, Anyang-si (KR); Jang Hoon Yang, Anyang-si (KR); Hyukjin Chae, Anyang-si (KR); Hyung Tae Kim, Anyang-si (KR); Yo Han Kim, Anyang-si (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/475,291

(22) Filed: Sep. 2, 2014

(65) Prior Publication Data

US 2014/0370931 A1  Dec. 18, 2014

Related U.S. Application Data

(63) Continuation of application No. 13/142,729, filed as application No. PCT/KR2009/007799 on Dec. 24, 2009, now Pat. No. 8,855,696.

(60) Provisional application No. 61/143,170, filed on Jan. 8, 2009.

(30) Foreign Application Priority Data

Mar. 26, 2009 (KR) .................. 10-2009-0026114

(51) Int. Cl.
H04B 7/00 (2006.01)
H04B 7/04 (2006.01)
(Continued)

(52) U.S. Cl.
CPC .............. *H04B 7/0417* (2013.01); *H04B 7/022* (2013.01); *H04B 7/0632* (2013.01);
(Continued)

(58) Field of Classification Search
CPC .. H04B 7/0639; H04B 7/0417; H04B 7/0632; H04B 7/0626; H04W 36/0061; H04W 72/0406; H04W 72/085
USPC ................. 455/436, 437, 442, 517, 522, 524; 370/331, 332
See application file for complete search history.

(56) References Cited

U.S. PATENT DOCUMENTS 6,631,263 B1 * 10/2003 Corkery ......................... 455/436
8,359,042 B2 * 1/2013 Kim ..................... H04B 7/0617
455/135
(Continued)

FOREIGN PATENT DOCUMENTS

JP       2002-159046 A    5/2002
KR    10-2008-0101631 A   11/2008
(Continued)

*Primary Examiner* — Duc M Nguyen
(74) *Attorney, Agent, or Firm* — Birch, Stewart, Kolasch & Birch, LLP

(57) ABSTRACT

A method and mobile station are described for reporting channel quality information for multi-cell cooperation. The mobile station receives a channel quality request message for requesting channel quality information from a base station. The channel quality request message indicates that the mobile station is one of a plurality of candidate mobile stations to perform multi-cell cooperation. The mobile station reports the channel quality information to the base station. The channel quality information includes first channel quality information for the base station and second channel quality information for a neighboring base station.

4 Claims, 11 Drawing Sheets

(51) Int. Cl.
*H04W 72/04* (2009.01)
*H04W 72/08* (2009.01)
*H04B 7/02* (2006.01)
*H04B 7/06* (2006.01)

(52) U.S. Cl.
CPC ........ *H04B 7/0639* (2013.01); *H04W 72/0406* (2013.01); *H04W 72/085* (2013.01); *H04B 7/063* (2013.01); *H04B 7/0619* (2013.01)

(56) References Cited

U.S. PATENT DOCUMENTS

| | | | |
|---|---|---|---|
| 8,369,788 B2 | 2/2013 | Kim et al. | |
| 8,488,480 B2 | 7/2013 | Han et al. | |
| 8,615,198 B2 | 12/2013 | Han et al. | |
| 8,855,696 B2* | 10/2014 | Yang et al. | 455/517 |
| 2002/0061000 A1 | 5/2002 | Kakura | |
| 2004/0176097 A1 | 9/2004 | Wilson et al. | |
| 2005/0281228 A1* | 12/2005 | Oh et al. | 370/331 |
| 2007/0191066 A1 | 8/2007 | Khojastepour et al. | |
| 2008/0117999 A1* | 5/2008 | Kadous et al. | 375/267 |
| 2009/0042558 A1* | 2/2009 | Shen et al. | 375/261 |
| 2009/0052405 A1 | 2/2009 | Ko et al. | |
| 2009/0059844 A1 | 3/2009 | Ko et al. | |
| 2009/0191862 A1* | 7/2009 | Amirijoo et al. | 455/424 |
| 2009/0207822 A1* | 8/2009 | Kim et al. | 370/338 |
| 2010/0035627 A1 | 2/2010 | Hou et al. | |
| 2010/0074316 A1 | 3/2010 | Kim et al. | |
| 2010/0105402 A1 | 4/2010 | Chun et al. | |
| 2010/0189093 A1 | 7/2010 | Palanki et al. | |
| 2010/0309996 A1* | 12/2010 | Lim et al. | 375/260 |
| 2011/0034192 A1* | 2/2011 | Lim et al. | 455/501 |
| 2011/0105164 A1* | 5/2011 | Lim et al. | 455/501 |
| 2011/0216817 A1 | 9/2011 | Kim et al. | |

FOREIGN PATENT DOCUMENTS

| | | |
|---|---|---|
| KR | 10-2008-0111774 A | 12/2008 |
| KR | 10-2008-0114518 A | 12/2008 |
| KR | 10-2008-0114519 A | 12/2008 |
| WO | WO 2008/085096 A1 | 7/2008 |

* cited by examiner

FIG. 2

|  | $W_{2,1}$ | $W_{2,2}$ | $W_{2,3}$ | $W_{2,4}$ |
|---|---|---|---|---|
| $W_{1,1}$ |  |  |  |  |
| $W_{1,2}$ |  |  |  |  |
| $W_{1,3}$ |  |  |  |  |
| $W_{1,4}$ |  |  |  |  |

METHOD AND APPARATUS FOR DATA TRANSMISSION BASED ON MULTIPLE CELL COLLABORATION

CROSS-REFERENCE TO RELATED APPLICATIONS

This application is a Continuation of co-pending U.S. application Ser. No. 13/142,729 filed on Jun. 29, 2011, which is the National Phase of PCT/KR2009/007799 filed on Dec. 24, 2009, which claims priority under 35 USC 119(e) to U.S. Provisional Application No. 61/143,170 filed on Jan. 8, 2009 and under 35 USC 119(a) to Korean Patent Application No. 10-2009-0026114 filed in Republic of Korea, on Mar. 26, 2009. The contents of all of these applications are hereby incorporated by reference as fully set forth herein in their entirety.

BACKGROUND OF THE INVENTION

1. Field of the Invention

The present invention relates to wireless communications, and more particularly, to multi-cell cooperation in a wireless communication system.

2. Discussion of the Related Art

A multiple-input multiple-output (MIMO) system is a system which uses multiple transmit antennas and multiple receive antennas to improve transmission/reception efficiency. In theory, the MIMO system has maximum channel capacity when using dirty paper coding in which data of other users is removed in advance by a base station (BS) when the data acts as interference to each user, and thus interference from other users is reduced. However, the dirty paper coding has a problem in that it is difficult to be implemented in an actual system since not only a transmitter requires much channel information but also computational complexity is high. Various schemes for concurrently allocating spatial resources to a plurality of users have recently been proposed so that the principle of the dirty paper coding can be implemented in practice.

An example of selecting a precoding matrix is proposed in per user unitary and rate control (PU2RC) disclosed in a contribution document R1-060335 "Downlink MIMO for EUTRA" provided by Samsung Electronics Ltd. In this example, each user selects a precoding vector capable of maximizing a channel data rate of each user from a plurality of precoding matrices, and feeds back an index of the selected precoding vector and a signal to interference plus noise ratio (SINR) to a BS. On the basis of information fed back from each user, the BS selects a precoding matrix and a user.

Research on a multi-cell cooperative system capable of obtaining a diversity gain by using cooperative communication of a plurality of BSs has actively been conducted in recent years. The multi-cell cooperative system has been introduced to provide cell coverage extension, throughput enhancement, performance enhancement in a cell edge region, etc.

In a system in which a feedback is limited, a multi-cell cooperative scheme can be divided according to a level of information sharing between BSs. That is, the multi-cell cooperative scheme can be divided into: a first scheme in which channel information and transmission data information are not shared between BSs; a second scheme in which only channel information is shared and data information is not shared between BSs; a third scheme in which only data information is shared and channel information is not shared between BSs; and a fourth scheme in which channel information and data information are both shared between BSs. It is expected that the fourth scheme has best performance in theory, but if all BSs participating in the multi-cell cooperation share data and channel information of all users, a load of a backhaul network increases and thus a problem may arise in actual system implementation. A precoding method using a scheme of sharing both channel information and data information between BSs is disclosed in a contribution document R1-084114 "Per-cell precoding methods for downlink joint processing CoMP" proposed by Electronics and Communications Research Institute (ETRI).

When data information of users belonging to all BSs participating in cooperation is shared between BSs in the multi-cell cooperative system, a load of a backhaul network and a buffer size of a BS are increased. This may act as a significant burden in the designing of a wireless communication system that requires high-speed data transmission.

SUMMARY OF THE INVENTION

The present invention provides multi-cell cooperation using sharing of channel information without having to share data information.

The present invention also provides a method and apparatus for data transmission based on multi-cell cooperation.

The present invention also provides a method and apparatus for feeding back reduced channel information for multi-cell cooperation.

In an aspect, a data transmission method performed by a base station (BS) and based on multi-cell cooperation is provided. The method includes receiving at least one channel quality indicator (CQI) from each mobile station (MS) in a cell, selecting a plurality of candidate MSs on the basis of the received CQI, receiving from each candidate MS a serving precoding matrix index (PMI) for a serving BS, a neighboring PMI for a neighboring BS, and a CQI obtained from the serving PMI and the neighboring PMI, selecting a transmission MS and a transmission PMI to be used for the data transmission on the basis of the serving PMI, neighboring PMI, and CQI received from each candidate MS, and transmitting data to the transmission MS by using a precoding matrix indicated by the transmission PMI.

The method may further include notifying a result of the selection to the plurality of candidate MSs.

The transmission MS and the transmission PMI may be selected by exchanging a PMI and a CQI with the neighboring BS so that a sum between a data rate of the serving BS and a data rate of the neighboring BS is the greatest in the selected MS.

In another aspect, a data transmission method performed by a BS and based on multi-cell cooperation is provided. The method includes receiving first channel quality information from each MS in a cell, sharing channel quality information with a neighboring BS on the basis of the first channel quality information and selecting a transmission PMI and a neighboring transmission PMI used by the neighboring BS, transmitting the neighboring transmission PMI to each MS, receiving, from each MS, second channel quality information obtained from the neighboring transmission PMI, selecting a transmission MS on the basis of the second channel quality information, and transmitting data to the transmission MS by using a precoding matrix indicated by the transmission PMI.

The first channel quality information may include a PMI belonging to a codebook used by the BS and a CQI corresponding to the PMI.

The method may further include transmitting the transmission PMI to each MS.

In another aspect, a channel information feedback method performed by an MS and based on multi-cell cooperation is provided. The method includes transmitting, to a BS, first channel quality information including channel information between the MS and the BS, receiving a channel quality information request message from the BS after transmitting the first channel quality information, and transmitting second channel quality information including channel information between the MS and the BS and a neighboring BS in response to the channel quality information request message.

The first channel quality information may include a PMI selected from a codebook and a CQI corresponding to the PMI.

The channel quality information request message may include a transmission PMI of the neighboring BS.

A feedback from a mobile station can be reduced for implementation of multi-cell cooperation and a load of a backhaul network can also be reduced. Therefore, a wireless communication system that requires high-speed data processing can be implemented.

BRIEF DESCRIPTION OF THE DRAWINGS

FIG. 2 shows precoding matrix compositions when G=4.

DETAILED DESCRIPTION OF THE INVENTION

Methods, apparatuses, and technologies described below are applicable to various radio access schemes such as code division multiple access (CDMA), frequency division multiple access (FDMA), time division multiple access (TDMA), orthogonal frequency division multiple access (OFDMA), single carrier frequency division multiple access (SC-FDMA), etc. The radio access scheme can be implemented with various radio communication standard systems. Wideband CDMA (WCDMA) can be implemented with a radio technique such as universal terrestrial radio access network (UTRAN) proposed by the 3rd generation partnership project (3GPP) standard organization. CDMA2000 is a radio technology based on CDMA. High rate packet data (HRPD) based on the 3rd generation partnership project 2 (3GPP2) standard organization provides a high packet data service in a CDMA2000-based system. Evolved HRPD (eHRPD) is an evolution of the HRPD. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. Long term evolution (LTE) is a part of an evolved UMTS (E-UMTS) using the E-UTRA, and uses the OFDMA in a downlink and uses the SC-FDMA in an uplink. LTE-advance (LTE-A) is an evolution of the LTE.

The technology described below may apply to a multiple antenna system or a multiple-input multiple-output (MIMO) system using multiple transmit (Tx) antennas and at least one receive (Rx) antenna. The technology described below may apply to various MIMO schemes. The MIMO scheme includes spatial diversity in which the same stream is transmitted to multiple layers and spatial multiplexing in which multiple streams are transmitted to multiple layers. When the multiple streams are transmitted to a single user in the spatial multiplexing, it is called single user-MIMO (SU-MIMO) or spatial division multiple access (SDMA). When the multiple streams are transmitted to multiple users in the spatial multiplexing, it is called multi user-MIMO (MU-MIMO). According to whether feedback information reported from each user is used or not, the spatial diversity and the spatial multiplexing can be classified into an open-loop scheme and a closed-loop scheme.

Figure 1:
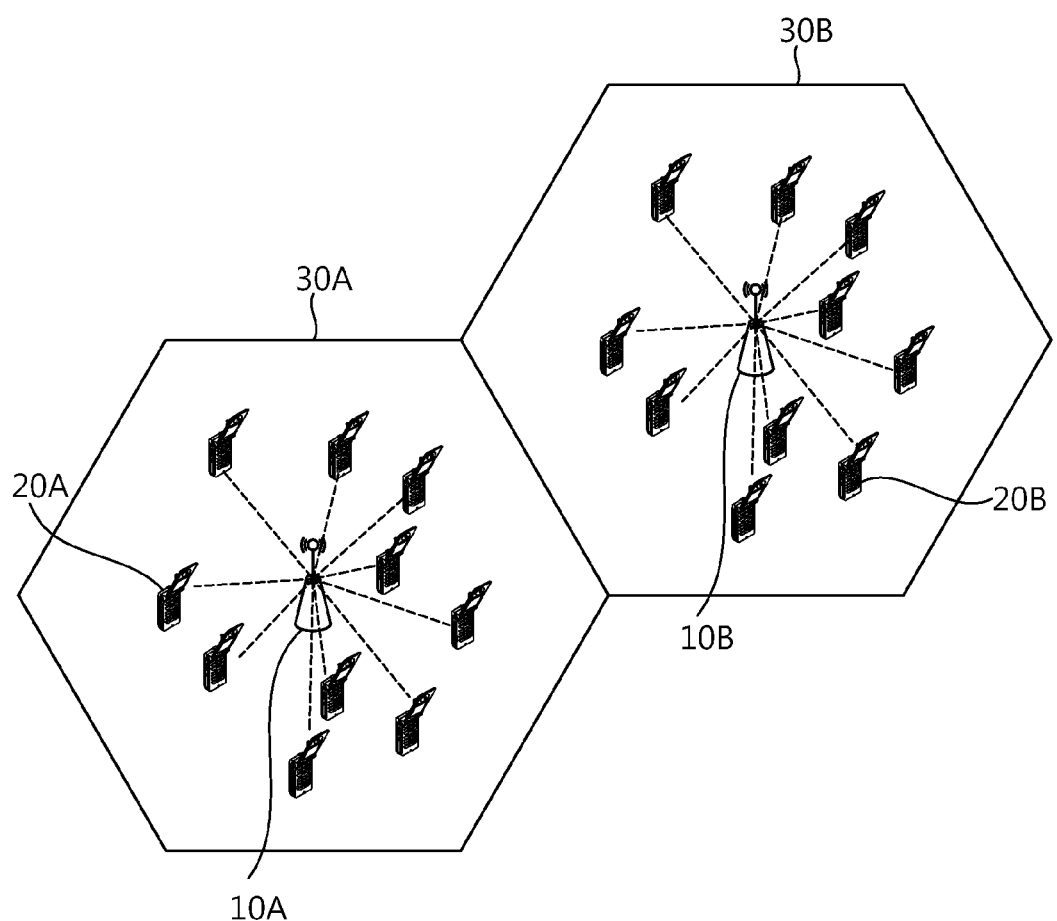
FIG. 1 shows a wireless communication system.

FIG. 1 shows a wireless communication system. The wireless communication system includes one or more base stations (BSs) 10A and 10B. The BSs 10A and 10B provide communication services to specific geographical regions 30A and 30B (generally referred to as cells), respectively. The cell can be divided into a plurality of regions (referred to as sectors). One BS may include one or more cells.

Mobile stations (MSs) 20A and 20B may be fixed or mobile, and may be referred to as another terminology, such as a user equipment (UE), a user terminal (UT), a subscriber station (SS), a wireless device, a personal digital assistant (PDA), a wireless modem, a handheld device, an access terminal (AT), etc. The BSs 10A and 10B are generally fixed stations that communicate with the MSs 20A and 20B and may be referred to as another terminology, such as an evolved node-B (eNB), a base transceiver system (BTS), an access point, an access network (AN), etc.

Hereinafter, a downlink (DL) denotes a communication link from the BS to the MS, and an uplink (UL) denotes a communication link from the MS to the BS. In the DL, a transmitter may be a part of the BS, and a receiver may be a part of the MS. In the UL, the transmitter may be a part of the MS, and the receiver may be a part of the BS.

The MS 20A located inside the cell 30A communicates with the serving BS 10A. A serving BS implies a BS accessed by the MS 20A, and a serving cell implies a cell managed by the serving BS. A neighboring cell implies a cell located near the serving cell. The neighboring cell is not limited to a geographical location. The neighboring cell is a cell that is cooperative to multi-cell cooperation.

Hereinafter, multi-cell cooperation will be described. It is assumed that one cell exists in one BS, and there are two types of cells, i.e., one serving cell and one neighboring cell.

Codebook-based unitary beamforming is considered in each cell. The codebook includes a plurality of precoding matrices. A serving BS and a neighboring BS may use identical or different codebooks. It is assumed that the serving BS and the neighboring BS each use Nt Tx antennas, and the two BSs each transmit L data streams (where L Nt). This implies that the serving BS and the neighboring BS have the same rank L. An Rx signal can be expressed by Equation 1 below.

$$Y_{k,1} = H_{k,1} W_{1,i} S_1 + H_{k,2} W_{2,j} S_2 + N_k \qquad \text{[Equation 1]}$$

In Equation 1, $Y_{k,i}$ denotes an Nr×1 Rx signal vector of a $k^{th}$ MS of an $i^{th}$ cell, $H_{k,i}$ denotes an Nr×Nt channel matrix between the $k^{th}$ MS and an $i^{th}$ BS, $W_{i,g}$ denotes a $g^{th}$ Nt×L unitary precoding matrix of the $i^{th}$ BS, $N_k$ denotes an Nr×1 noise vector, and $S_i$ denotes an L×1 Tx symbol vector. Herein, Nr denotes the number of Rx antennas. The rank L denotes the number of data streams that can be transmitted concurrently, and a maximum value of the rank L is a minimum value between Nr and Nt. For example, if Nt=4, Nr=2, then the maximum rank may be 2.

It is assumed that each BS has a codebook including G unitary matrices. $W_{i,s}$ is a precoding matrix selected from a codebook $[W_1, W_2, \ldots, W_G]$. A precoding matrix index (PMI) is an index of a precoding matrix selected from the codebook. If it is assumed herein that a minimum mean squared error (MMSE) receiver is used, an Rx SINR of an $i^{th}$ stream for a $g^{th}$ codebook of a $k^{th}$ MS of a $1^{st}$ cell can be expressed by Equation 2 below.

$$SINR_{k,1,g,i} = h_{eff,1,g,i}^H \cdot \left( \sum_{j \neq i}^{L} h_{eff,1,g,j} h_{eff,1,g,j}^H + \sum_{j=1}^{L} h_{eff,2,g',j} h_{eff,2,g',j}^H + \sigma^2 I_L \right)^{-1} \cdot h_{eff,1,g,i}$$ [Equation 2]

In Equation 2, $h_{eff,i,g,j}$ denotes an effective channel for a $j^{th}$ stream of a $g^{th}$ precoding matrix for an $i^{th}$ BS of a $k^{th}$ MS, and can be expressed by Equation 3 below.

$$h_{eff,1,g,i} = H_{k,1} w_{g,i}$$ [Equation 3]

In Equation 3, $w_{g,i}$ denotes an $i^{th}$ column vector of a $g^{th}$ precoding matrix.

If L<Nt in the codebook-based system, it can be seen that the Rx SINR has an effect on selection of a precoding matrix of a neighboring cell. This can be proved as follows. A part corresponding to interference of the neighboring cell can be expressed by Equation 4 below.

$$\sum_{j=1}^{L} h_{eff,2,g',j} h_{eff,2,g',j}^H = \sum_{j=1}^{L} H_{k,2} w_{g',j} w_{g',j}^H H_{k,2}^H$$ [Equation 4]
$$= H_{k,2} \left( \sum_{j=1}^{L} w_{g',j} w_{g',j}^H \right) H_{k,2}^H$$

In Equation 4, if L=Nt and Wg' is a unitary matrix, then $$\sum_{j=1}^{Nt} w_{g',j} w_{g',j}^H = I_{Nt}.$$

Herein, $I_{Nt}$ denotes an identify matrix. Thus, irrespective of the precoding matrix of the neighboring cell, it can be seen that power of an interference signal is identical to $H_{k,2} H^H_{k,2}$. However, since $$\sum_{j=1}^{Nt} w_{g',j} w_{g',j}^H \neq I_{Nt}$$

when L<Nt, it can be seen that interference power caused by the neighboring cell is influenced by the precoding matrix of the neighboring cell. This implies that if the rank is less than the number of Tx antennas, a gain can be obtained by the precoding matrix of the neighboring cell.

Therefore, if the number Nt of the Tx antennas is greater than the number L of data streams, a precoding matrix of each cell has an effect on an SINR of the neighboring cell, and thus when selecting a precoding matrix, each BS needs to consider the precoding matrix of the neighboring cell. A scheduling metric can be configured to select a precoding matrix of a serving BS and a precoding matrix of a neighboring BS. The scheduling metric is a criterion for selecting a user and/or a precoding matrix for data transmission. A sum of data rates, proportional fair (PR) scheduling, etc., can be used as the scheduling metric. For example, if the scheduling metric is the sum of data rates, the precoding matrix can be selected so that the sum of data rates of respective BSs becomes a maximum value. This can be expressed by Equation 5 below.

$$\max_{W_{1,j}, W_{2,j} \in codebook} R_1 + R_2$$ [Equation 5]

In Equation 5, $R_i$ denotes a data rate of an $i^{th}$ BS. When two cells are considered, precoding matrices $W_{1,j}$ and $W_{2,j}$ are preferably selected so that a sum (i.e., $R_1+R_2$) of a data rate $R_1$ of a $1^{st}$ BS and a data rate $R_2$ of a $2^{nd}$ BS becomes a maximum value.

Figure 2:
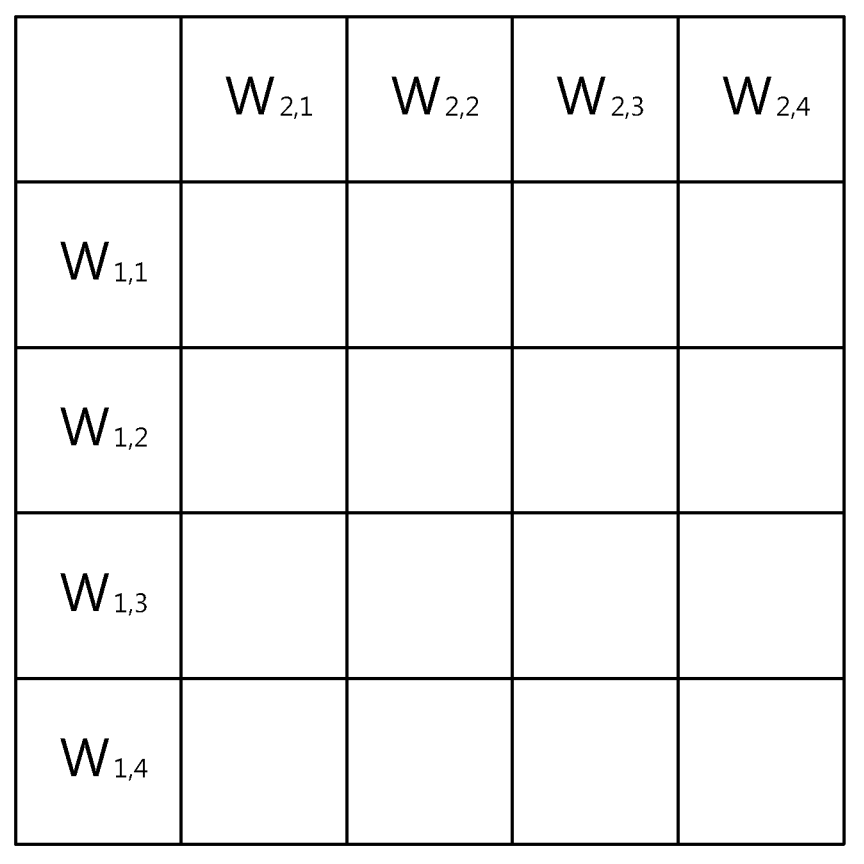

In order to calculate Equation 5 above, it is necessary for each MS to calculate an SINR for all possible cases of precoding matrix compositions by considering selection of the precoding matrix of the neighboring cell and to feed back all of the calculated SINRs. This implies that even if there are only two cells, the number of precoding matrices to be considered in practice is $G^2$. FIG. 2 shows precoding matrix compositions when G=4. Computational complexity may increase if each user calculates all of the precoding matrix compositions. In additions, signaling overhead may be caused if SINR information for each precoding matrix is entirely fed back to a BS. Therefore, there is a need for a method capable of decreasing overhead caused by a feedback of channel information.

Figure 3:
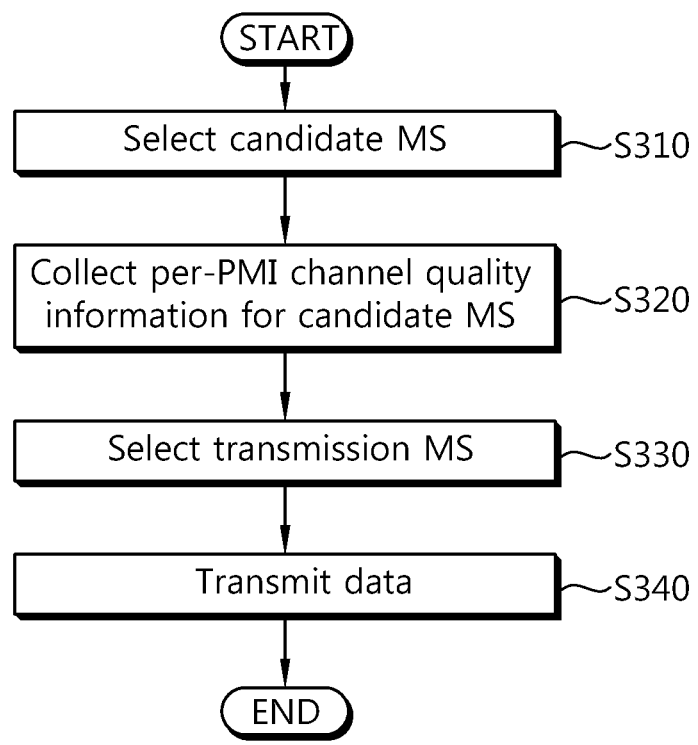
FIG. 3 is a flowchart showing a data transmission method according to an embodiment of the present invention.

FIG. 3 is a flowchart showing a data transmission method according to an embodiment of the present invention. This method can be performed by a BS. In step S310, the BS selects at least one candidate MS from a plurality of MSs in a cell. By considering not only a codebook of a serving BS but also a codebook of a neighboring BS, each MS sends channel quality information to the serving BS. The channel quality information includes a selected precoding matrix index (PMI), a rank indicator (RI) for the selected PMI, and/or a channel quality indicator (CQI) corresponding to the selected PMI. The channel quality information may further include a PMI for the neighboring BS. The selected PMI may be a PMI having a best CQI. The CQI can be expressed in various formats such as an SINR or a modulation and coding scheme (MCS) index. The BS selects a candidate MS on the basis of the received channel quality information of each MS.

In step S320, the BS collects channel quality information for each PMI belonging to a codebook from the selected candidate MS. In step S330, the BS selects a transmission MS for transmitting data according to a specific criterion on the basis of the per-channel channel quality information received from the candidate MSs, and selects a transmission PMI for the transmission MS. In step S340, the BS transmits the data to the transmission MS by using a precoding matrix indicated by the transmission PMI.

The MS can calculate a CQI for G PMIs for the serving BS and G PMI compositions for the neighboring BS, i.e., $G^2$ PMI compositions. In this case, when $G^2$ CQI values calculated in each MS are fed back to the serving BS, it may be act as a significant overhead. Therefore, instead of transmitting CQI values for all PMIs to all MS in a cell, a plurality of candidate MSs are selected from the all MSs in the cell and CQI information for the codebook of the serving BS and the codebook of the neighboring BS is selected from the candidate MSs. Then, each BS selects the transmission PMI and the transmission MS by using information collected from the plurality of candidate MSs, and transmits data by using the selected PMI and MS. By selecting some of candidate MSs among the MSs in the cell, an amount of feedback transmitted to the BS can be decreased according to the number of selected candidate MSs over the total number of MS.

Figure 4:
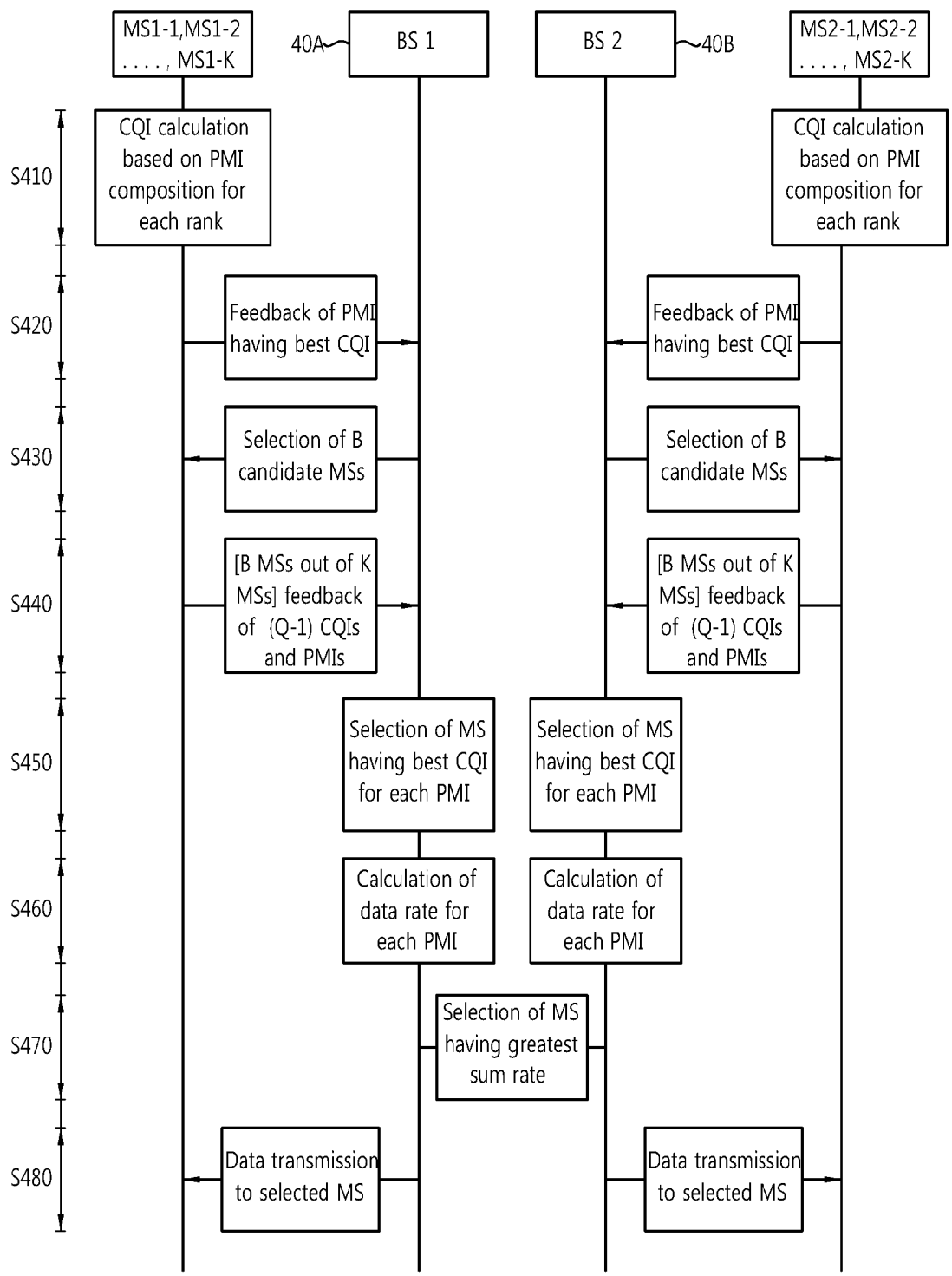
FIG. 4 shows an example of a data transmission method according to an embodiment of the present invention.

FIG. 4 shows an example of a data transmission method according to an embodiment of the present invention. A $1^{st}$ BS 40A is a serving BS for K MSs MS1-1, MS1-2, . . . , MS1-K, and a $2^{nd}$ BS 40B is a serving BS for K MSs MS2-1, MS2-2, . . . , MS2-K. A neighboring BS of the $1^{st}$ BS 40A is the $2^{nd}$ BS 40B, and a neighboring BS of the $2^{nd}$ BS 40B is the $1^{st}$ BS 40A. Although the serving BS has one neighboring BS, and K MSs belong to each BS, this is for exemplary purposes only. Thus, the number of neighboring BSs and the number of MSs belonging to each BS are not limited thereto.

In step S410, the MS calculates a CQI on the basis of a PMI composition for each rank. CQI values for compositions of all PMIs belonging to a codebook of the serving BS (hereinafter, a serving codebook) and a codebook of the neighboring BS (hereinafter, a neighboring codebook) are calculated. In each MS, information on the serving codebook and neighboring codebook for each rank may be stored in a memory. Alternatively, the serving BS may report the serving codebook and neighboring codebook to be used by the MS. It is assumed herein that each of the serving codebook and the neighboring codebook is configured with G PMIs. The number of CQIs that can be calculated by the MS may correspond to $G^2$.

In step S420, the MS feeds back a best CQI, a PMI corresponding to the CQI, and a neighboring PMI. The PMI may include a PMI selected from the serving codebook used by the serving BS (such a PMI is called a serving PMI) and/or a PMI selected from the neighboring codebook used by the neighboring BS (such a PMI is called a neighboring PMI). When two or more ranks can be configured, the MS can feed back a serving PMI, neighboring PMI, and RI selected for each rank and a CQI corresponding thereto. The MS selects a CQI indicating good channel quality among the calculated $G^2$ CQIs, and transmits the selected CQI, RI, and PMI. It is assumed herein that the number Nr of Rx antennas is 1 (i.e., rank L is 1 and thus only one Rx antenna exists), and one CQI is fed back. However, this is for exemplary purposes only, and thus the MS can feed back at least one CQI and/or PMI for each rank.

Alternatively, the BS can determine a threshold for sending a CQI to the MS. The MS can feed back at least one CQI exceeding the threshold among the calculated CQIs. The threshold can be reported by the BS to the MS through a broadcast channel and/or a dedicated channel. For example, the BS may report the threshold to the MS as a part of system information which is broadcast information.

In step S430, when one CQI is received from each MS, the BS selects B candidate MSs (where B≥1) on the basis of the received CQI, and notifies it to the selected candidate MSs. The BS can select the candidate MSs in a descending order of the best CQI. Although the $1^{st}$ BS 40A and the $2^{nd}$ BS 40B equally select B candidate MSs herein, this is for exemplary purposes only. To notify the selection result to the candidate MSs, signaling can be used variously. It can be reported by using a broadcast message such as system information, a radio resource control (RRC) message, or a message to be transmitted through the dedicated channel.

In step S440, the selected B candidate MSs transmit (Q-1) CQIs and PMIs corresponding thereto to the BS. In this case, the transmitted PMI may include a serving PMI and/or a neighboring PMI. Herein, Q denotes the total number of CQIs transmitted by the candidate MSs to the BS. Since one CQI has already been sent in step S410, (Q-1) CQIs are sent in step S440. A maximum value of Q may be $G^2$, and may be reported to the MS when the BS notifies to the MS that the MS is selected as the candidate MS, or may be reported by using a separate message.

In step S450, the BS selects one or more MSs having the best CQI on the basis of the CQI and PMI received from each candidate MS. In step S460, the BS calculates a data rate for each PMI with respect to each of the selected MSs. In step S470, the $1^{st}$ BS 40A and the $2^{nd}$ BS 40B exchange the PMI and the CQI of the selected MS, and selects a transmission MS according to a scheduling metric. A sum of data rates, proportional fair (PR) scheduling, etc., can be used as the scheduling metric. For example, if the scheduling metric is the sum of data rates, an MS of which a sum between a data rate of the serving BS and a data rate of the neighboring BS is the best can be selected as the transmission MS. In addition, each BS can select a transmission PMI used by the transmission MS. Each BS can select one transmission MS, or can select a plurality of MSs in a magnitude order of the sum of data rates. In step S480, the BS transmits data by using a precoding matrix indicated by the transmission PMI to the selected transmission MS.

Instead of requesting a CQI for all PMI compositions (e.g., $G^2$ compositions) from K MSs belonging to each cell, the CQI is requested by selecting B candidate MSs of which a CQI is regarded as relatively good. Herein, B<K. In this case, instead of requesting the CQI for all cases from the B candidate MSs, Q CQIs are requested, where Q≤$G^2$. That is, it is not necessary for all MSs to feed back all CQIs for the $G^2$ PMIs. Rather, all MSs feed back only one CQI, and then based on information thereof, request (Q-1) CQIs from top B candidate MSs, thereby effectively decreasing an amount of feedback.

Figure 5:
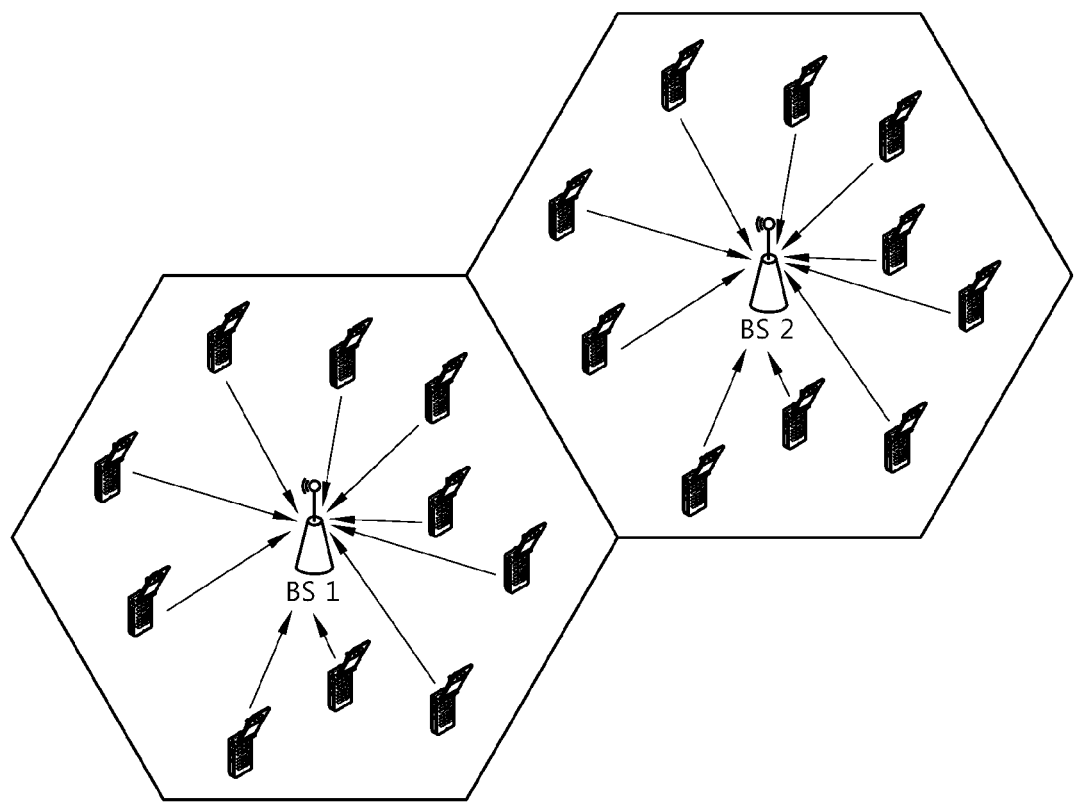
FIG. 5 to FIG. 7 show exemplary implementations of a data transmission method.
Figure 6:
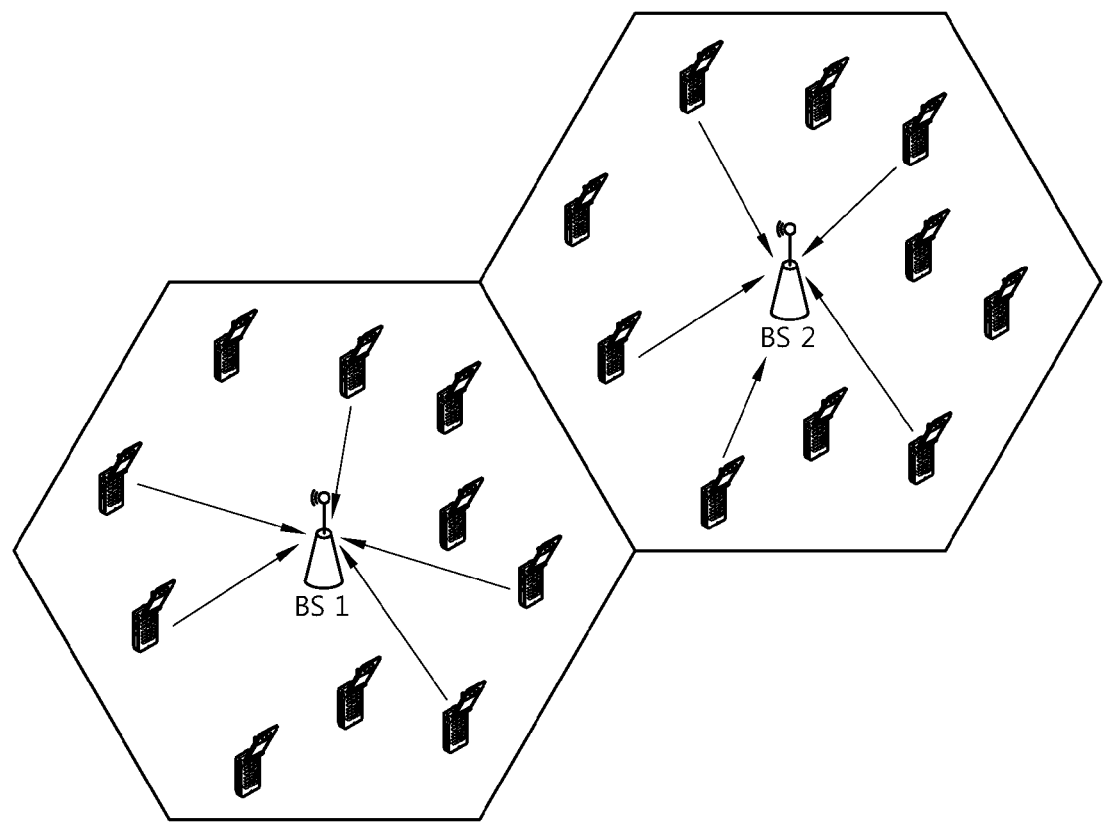
Figure 7:
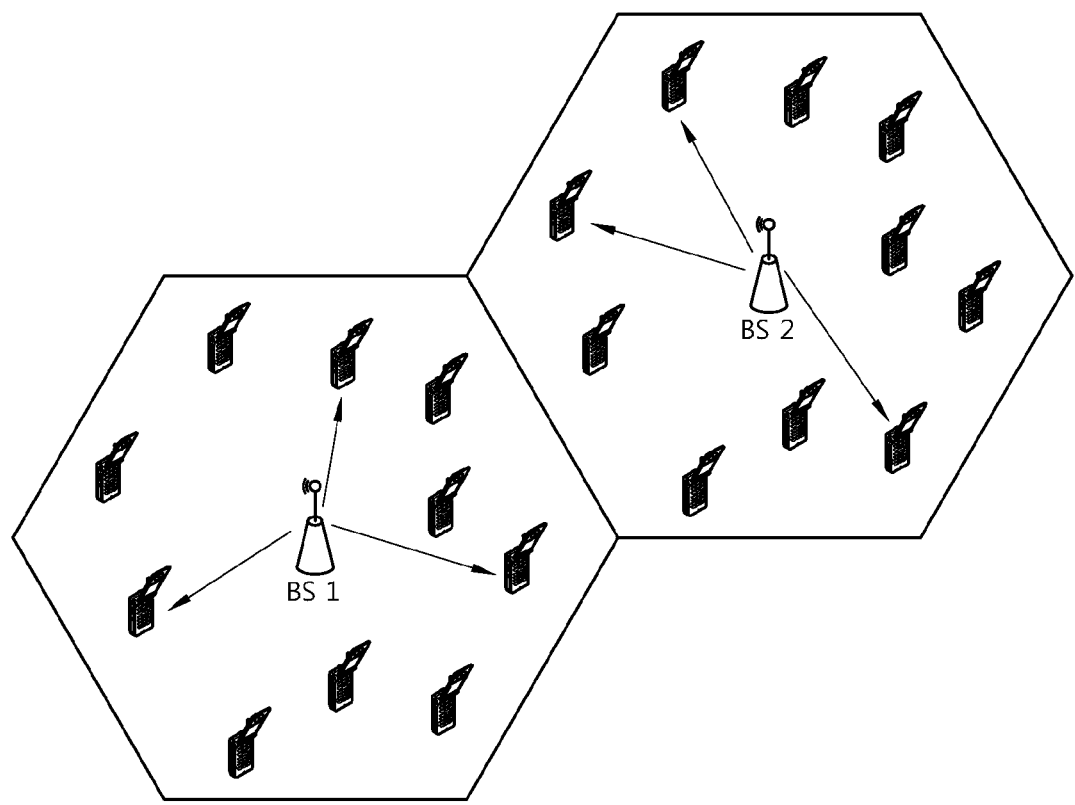

FIG. 5 to FIG. 7 show exemplary implementations of a data transmission method. In FIG. 5, K=10. A $1^{st}$ BS and a $2^{nd}$ BS receive one CQI and its corresponding PMI from 10 MSs. The PMI may include a serving PMI and/or a neighboring PMI. In FIG. 6, B=5. A $1^{st}$ BS and a $2^{nd}$ BS receive a CQI based on each PMI composition from 5 selected candidate MSs. In FIG. 7, three transmission MSs are selected. A $1^{st}$ BS and a $2^{nd}$ BS each transmit data to the selected transmission MSs.

Figure 8:
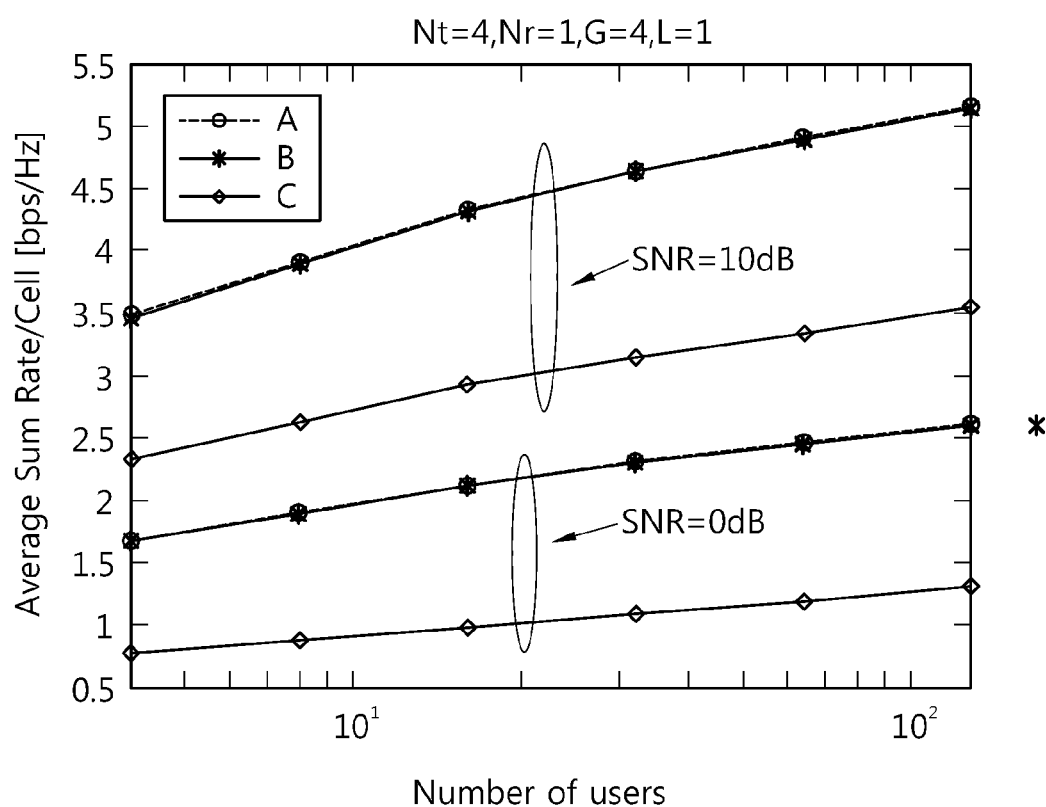
FIG. 8 and FIG. 9 are graphs showing a simulation result.
Figure 9:
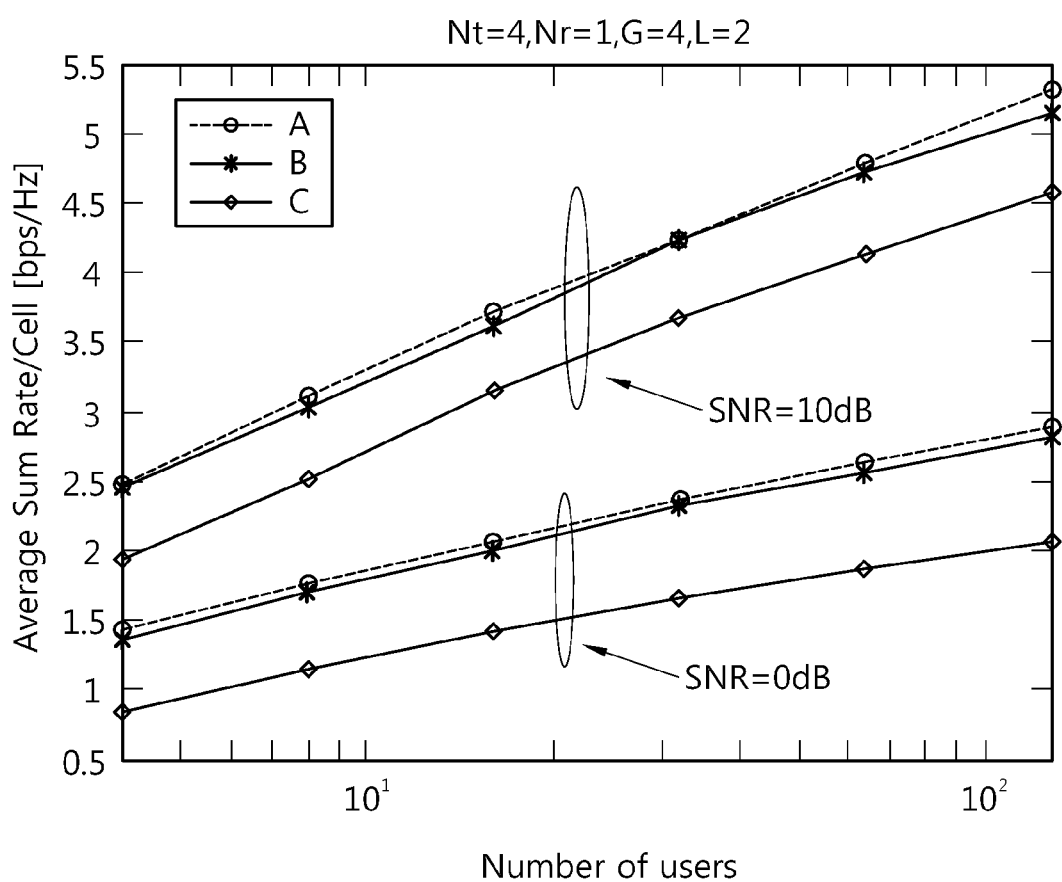

FIGS. 8 and 9 are graphs showing a simulation result. FIG. 8 is a graph for comparing sum rates when Nr=4, Nr=1, G=4, L=1. Table 1 below shows values K, B, and Q, where K denotes the number of MSs in each cell, B denotes the number of candidate MSs, and Q denotes the number of CQIs received from the candidate MSs.

TABLE 1

| K | 4 | 8 | 16 | 32 | 64 | 128 |
| B | 4 | 6 | 8  | 8  | 9  | 9   |
| Q | 4 | 3 | 2  | 2  | 2  | 2   |

In this case, a simulation is performed for cases where a signal-to-noise ratio (SNR) is 0 DB and 10 dB, and an average of data rates are used by measuring the data rates of finally selected transmission MSs. Referring to FIG. 8, a proposed method (i.e., case B) shows a data rate almost similar to that of a case A where a CQI is transmitted for all possible codebooks that can be combined from all MSs in a cell. Further, the proposed method (i.e., case B) shows that a data rate is significantly improved in comparison with a case C where a BS cooperation scheme is not used.

FIG. 9 is a graph for comparing sum rates when Nr=4, Nr=1, G=4, L=2. Table 2 below shows values K, B, and Q, where K denotes the number of MSs in each cell, B denotes the number of candidate MSs, and Q denotes the number of CQIs received from the candidate MSs. A test result on a data rate is shown in the graph.

TABLE 2

| K | 4 | 8 | 16 | 32 | 64 | 128 |
|---|---|---|----|----|----|-----|
| B | 4 | 6 | 13 | 13 | 13 | 25  |
| Q | 10| 8 | 4  | 4  | 4  | 2   |

A proposed method (i.e., case B) shows a data rate almost similar to that of a case A where a CQI is transmitted for all possible codebooks that can be combined from all MSs in a cell. Further, the proposed method (i.e., case B) shows that a data rate is significantly improved in comparison with a case C where a BS cooperation scheme is not used.

Although it is shown herein that the number of BSs participating in cooperation is 2, the present invention is not limited thereto. The technical features of the present invention can be easily used for n neighboring BSs (where n≥1) by those ordinary skilled in the art.

The BSs participating in cooperation may have independent ranks That is, each BS may have a different rank, and the number of precoding matrices included in a codebook may also differ. Rank information on the BSs participating in cooperation may be mutually exchanged in advance.

Figure 10:
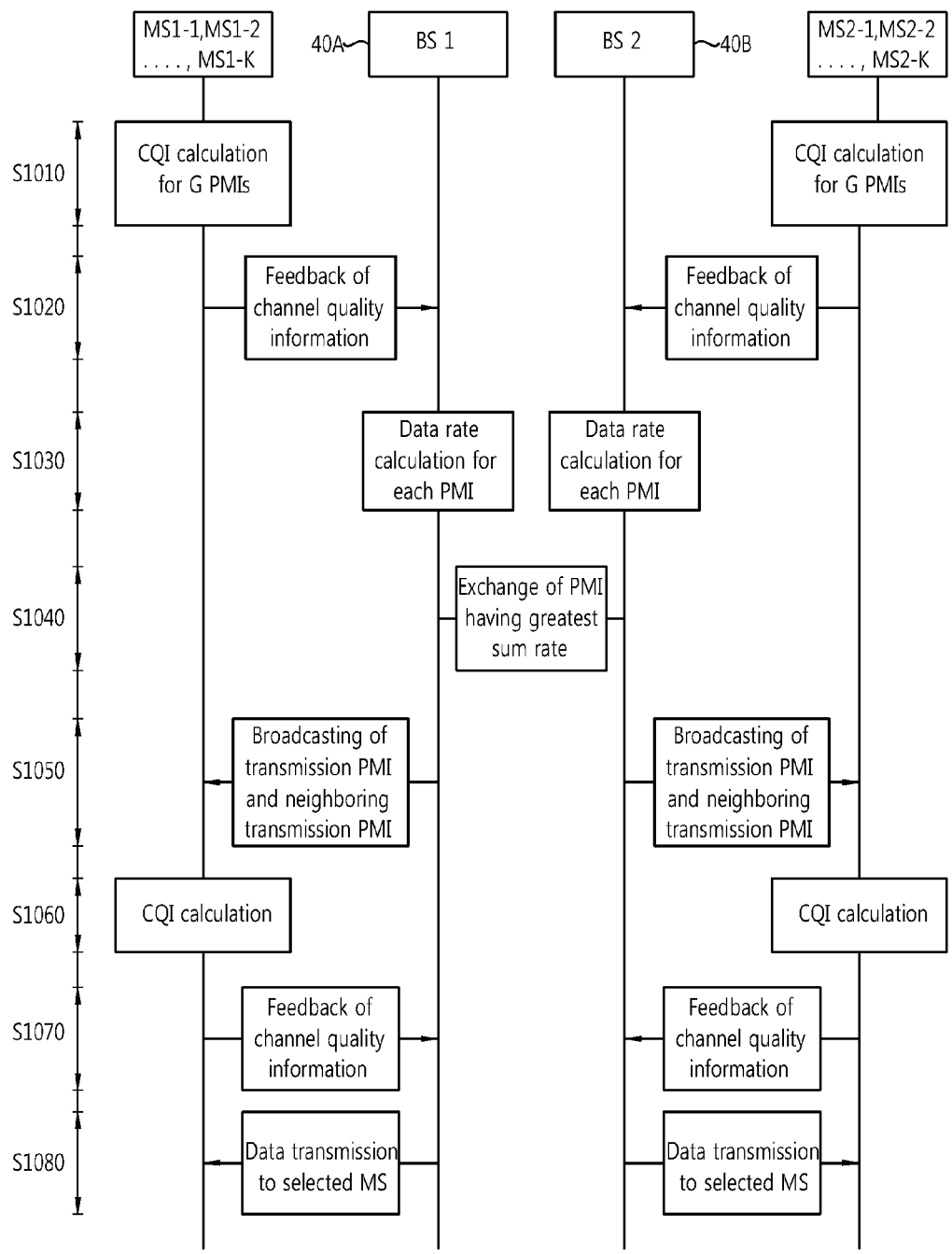
FIG. 10 is a flowchart showing a data transmission method according to another embodiment of the present invention.

FIG. 10 is a flowchart showing a data transmission method according to another embodiment of the present invention. In step S1010, each MS calculates a CQI for G PMIs belonging to its serving codebook. That is, unlike the embodiment of FIG. 4, the MS calculates only a CQI for a PMI belonging to a serving codebook without considering an influence of a neighboring BS. In step S1020, the MS feeds back $1^{st}$ channel quality information to a serving BS. The $1^{st}$ channel quality information may include the best CQI among G CQIs, its corresponding RI, and/or PMI. It is assumed herein that the $1^{st}$ channel quality information is one rank, and thus includes one CQI and its corresponding PMI.

Alternatively, the BS can determine a threshold for sending a CQI to the MS. The MS can feed back at least one CQI exceeding the threshold among the calculated CQIs. The threshold can be reported by the BS to the MS through a broadcast channel and/or a dedicated channel. For example, the BS may report the threshold to the MS as a part of system information which is broadcast information.

In step S1030, the BS calculates a data rate for each PMI. In step S1040, each BS exchanges the PMI and the data rate with its neighboring BS, and selects a PMI having the greatest sum rate. Each BS selects a PMI used by itself (such a PMI is called a transmission PMI) and a PMI used by the neighboring BS (such a PMI is called a neighboring transmission PMI). Although the sum rate is considered as a scheduling metric for selecting the transmission PMI and the neighboring transmission PMI, this is for exemplary purposes only.

In step S1050, the BS broadcasts the transmission PMI and the neighboring transmission PMI. That is, the BS reports the transmission PMI and the neighboring transmission PMI to all MSs in a cell. The transmission PMI and/or the neighboring transmission PMI can be transmitted to the MS by being included in a channel quality information request message.

The channel quality information request message is a message used by the BS to request the MS to measure channel quality based on the transmission PMI and the neighboring transmission PMI and to report a result value of the measurement.

In step S1060, the MSs in the cell calculate a CQI on the basis of the transmission PMI and the neighboring transmission PMI. In step S1070, the MSs in the cell feed back $2^{nd}$ channel quality information. The $2^{nd}$ channel quality information includes a CQI calculated based on the transmission PMI and the neighboring transmission PMI. In step S1080, the BS selects an MS for data transmission on the basis of the $2^{nd}$ channel quality information, and transmits the data to the selected MS by using the transmission PMI and the neighboring transmission PMI.

Figure 11:
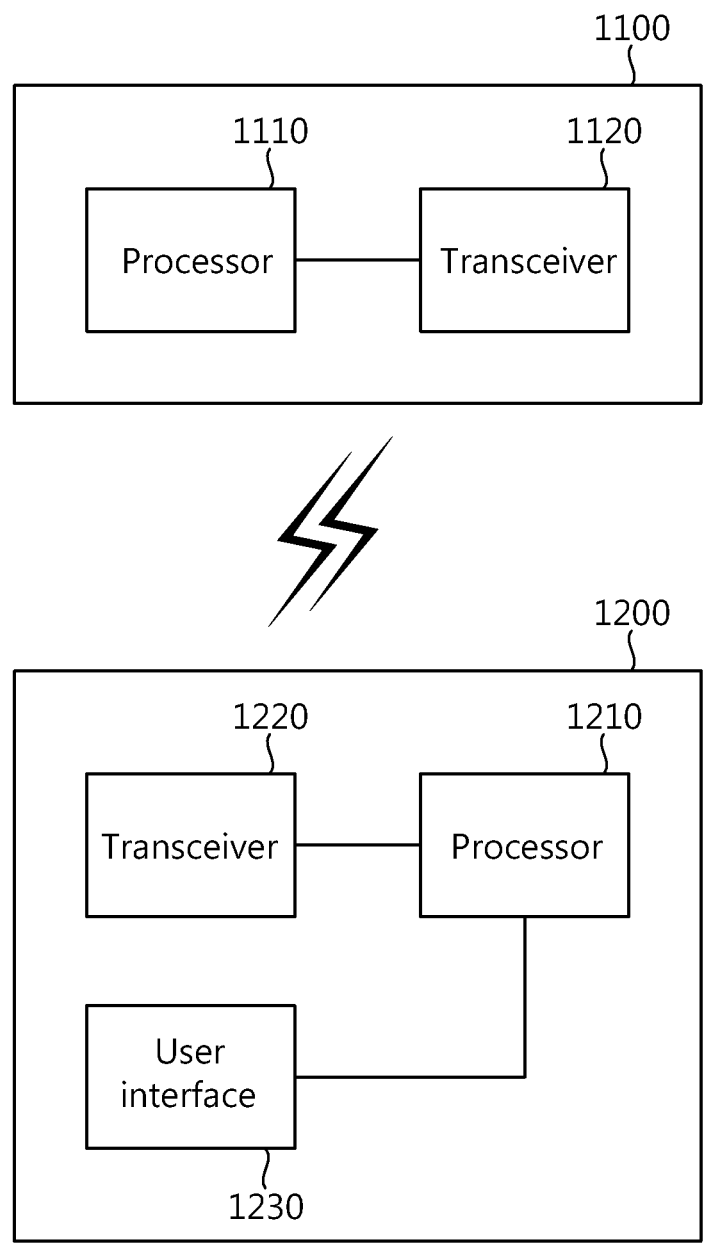
FIG. 11 is a block diagram of a base station and a mobile station for implementing an embodiment of the present invention.

FIG. 11 is a block diagram of a BS and an MS for implementing an embodiment of the present invention. A BS 1100 includes a processor 1110 and a transceiver 1120. The transceiver 1120 transmits and/or receives a radio signal. The processor 1110 is coupled to the transceiver 1120, and implements the method described in the embodiment of FIG. 4 and/or FIG. 10.

An MS 1200 includes a processor 1210, a transceiver 1220, and a user interface 1230. The transceiver 1220 transmits and/or receives a radio signal. The processor 1210 is coupled to the transceiver 1220, and implements the method described in the embodiment of FIG. 4 and/or FIG. 10. The user interface 1230 is coupled to the processor 1210, and provides an interface with respect to a user. The user interface 1230 may include an input tool such as a well-known keypad and/or a display device for providing a user environment.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for reporting channel quality information for multi-cell cooperation, the method performed by a mobile station and comprising:

receiving, by the mobile station, precoding matrix indicator (PMI) information from a first base station, the PMI information including G PMIs available to be used by the first base station to send downlink data and G PMIs available to be used by a second base station to send downlink data;

receiving, by the mobile station, a channel quality request message for requesting channel quality information from the first base station, the channel quality request message indicating that the mobile station is selected, by the first base station from among a plurality of candidate mobile stations, to perform multi-cell cooperation;

calculating $G^2$ channel quality indicators (CQIs) based on $G^2$ combinations of the G PMIs of the first base station and the G PMIs of the second base station; and reporting, by the mobile station, the channel quality information to the first base station, wherein the channel quality information includes a first best CQI and a first PMI corresponding to the first best CQI for the first base station, and a second best CQI and a second PMI corresponding to the second best CQI for the second base station.

2. The method of claim 1, wherein the plurality of candidate mobile stations each reports its channel quality information to the first base station.

3. A mobile station for reporting channel quality information for multi-cell cooperation, the mobile station comprising:

a transceiver configured to transmit and receive radio signals; and a processor operatively coupled with the transceiver and configured to:

instruct the transceiver to receive precoding matrix indicator (PMI) information from a first base station, the PMI information including G PMIs available to be used by the first base station to send downlink data and G PMIs available to be used by a second base station to send downlink data;

instruct the transceiver to receive a channel quality request message for requesting channel quality information from the first base station, the channel quality request message indicating that the mobile station is selected, by the first base station from among a plurality of candidate mobile stations, to perform multi-cell cooperation;

calculate G2 channel quality indicators (CQIs) based on $G^2$ combinations of the G PMIs of the first base station and the G PMIs of the second base station; and instruct the transceiver to report the channel quality information to the first base station, wherein the channel quality information includes a best CQI and a first PMI corresponding to the first best CQI for the first base station, and a second best CQI and a second PMI corresponding to the second best CQI for the second base station.

4. The mobile station of claim 3, wherein the plurality of candidate mobile stations each reports its channel quality information to the first base station.

* * * * *